Nov. 20, 1956    J. J. SHUMAKER    2,770,919
DISPLAY UNIT
Filed June 2, 1953    4 Sheets-Sheet 1
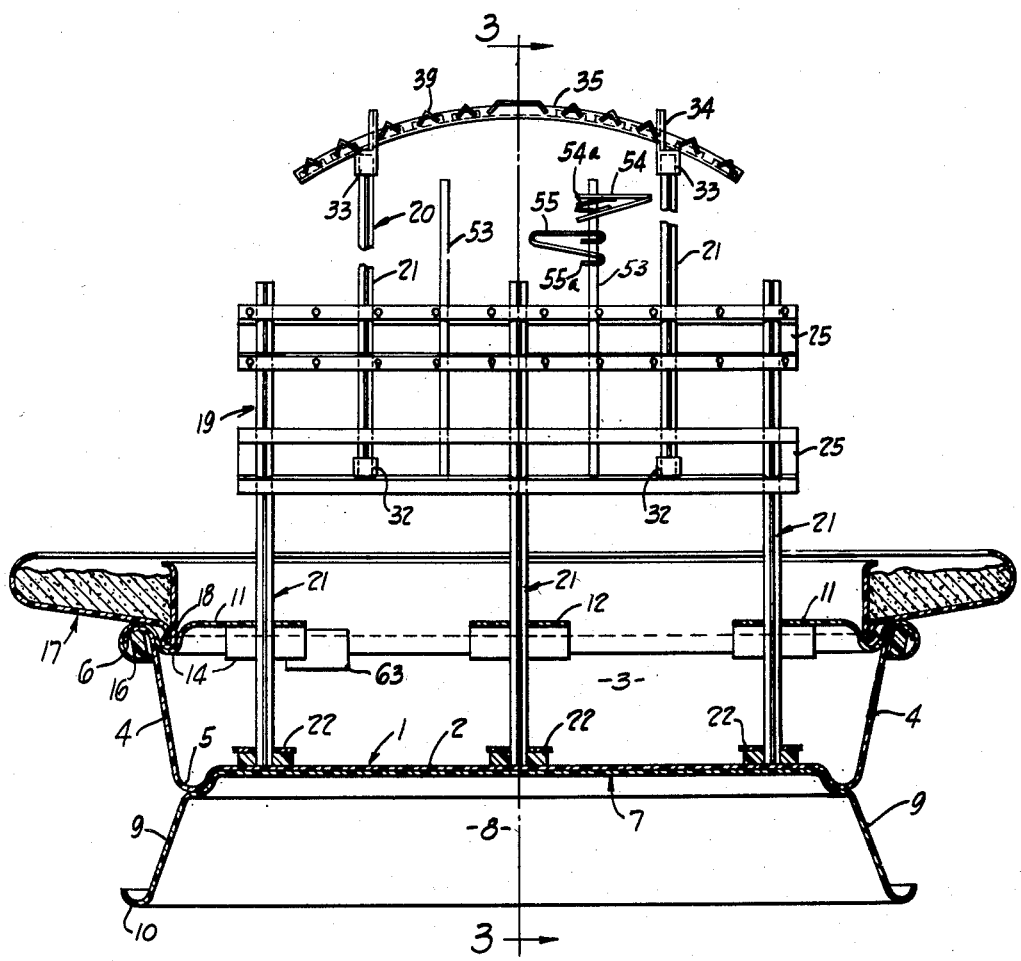
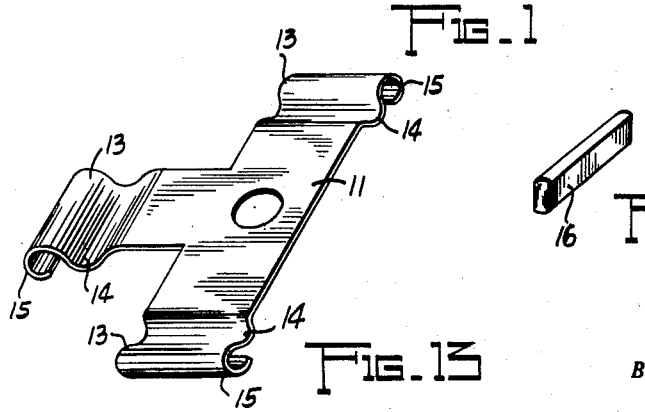

Nov. 20, 1956  J. J. SHUMAKER  2,770,919
DISPLAY UNIT
Filed June 2, 1953  4 Sheets-Sheet 2
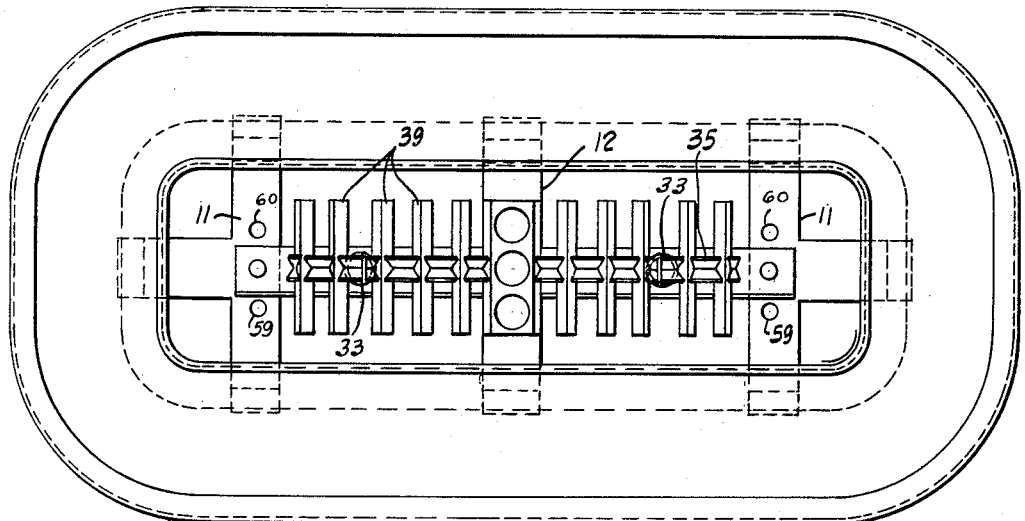
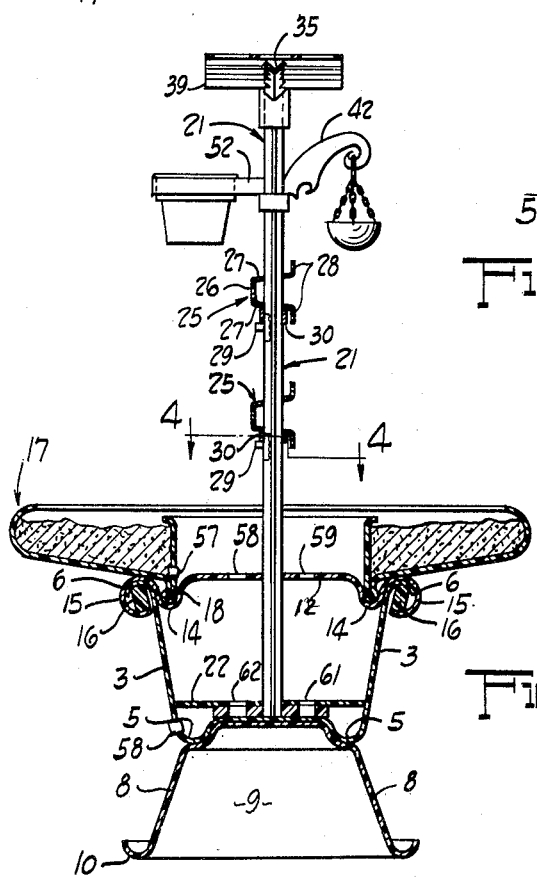
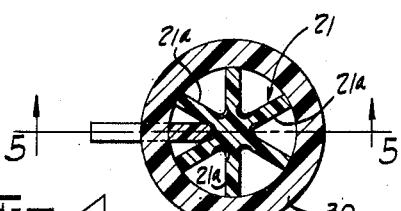
INVENTOR.
James J. Shumaker
BY Robb & Robb
attorneys Nov. 20, 1956

J. J. SHUMAKER 2,770,919

DISPLAY UNIT

Filed June 2, 1953

INVENTOR.
James J. Shumaker
BY Robb & Robb
Attorneys

Nov. 20, 1956  J. J. SHUMAKER  2,770,919
DISPLAY UNIT
Filed June 2, 1953  4 Sheets-Sheet 4

INVENTOR.
James J. Shumaker
BY Robb & Robb
attorneys

United States Patent Office 2,770,919
Patented Nov. 20, 1956

2,770,919
DISPLAY UNIT
James J. Shumaker, Wickliffe, Ohio
Application June 2, 1953, Serial No. 359,187
9 Claims. (Cl. 47—39)

This invention relates to display units, and more particularly to such units which are adapted to support thereon flowers or the like in various kinds of containers, there being furnished a unique organization of parts which is susceptible of enhancing the arrangement of growing plants and other associated types of growing things.

In particular, the invention is intended to avail of the use of relatively thin material such as plastic as the same is commonly denoted, and provides novel parts which afford opportunity for flexibility of display and yet substantial rigidity and ruggedness.

While the display has been primarily designed to avail of the beauty and form ability of plastic of the nature referred to above, it is to be understood that this is not necessarily the only material or materials from which the same may be fabricated.

In view of the relatively high cost of plastic material itself, where the same can be used in manufacturing by availing of the thinnest cross sectional dimension, stability and rigidity must be provided by novel inter-engagement of parts. Adjustability of those parts is also obviously desirable and if attained, further enhances flexibility and possibilities of adaptation for extended use for a variety of purposes.

The foregoing attributes are incorporated in this invention, which comprises a main plastic base or vessel, formed of material of relatively thin cross section, and including a substantially continuous side wall extending around the periphery of a bottom member, the upper edge of the side wall having a rolled or outwardly and downwardly extending lip portion.

Seated at the lip and upon suitable stiffening members, is a rectilinear-like member, having parts inter-engaged with the stiffening members and adapted to support earth or similar material in which plants may be grown.

Extending upwardly from the bottom of the vessel and suitably engaged with the said stiffening members and the bottom, is a further stiffening and supporting unit, which is formed so as to add rigidity to the entire structure, and in addition a further stiffening and supporting unit is mounted above that first mentioned.

With the foregoing general description of the invention in mind it is a particular object hereof to provide in a device or unit of this class, for the formation of the various parts, whereby the same may be inter-locked, and as indicated provide for substantial rigidity and stiffness, even though the materials be of relatively thin cross section and in and of itself of a relatively flexible nature.

It is a further object of this invention to provide for the use of stiffening and display units, engaged with the main body part of the invention, in such a manner as to additionally provide for rigidity and at the same time adjustability of parts associated therewith, whereby the display of the flowers or the growing of the same may be readily facilitated.

It is a further object of this invention, to form the parts in such a manner as to permit of the engagement and inter-changeability of certain of the same in order to provide for desirable adjustment and re-arrangement of the units, in addition to the fact that a considerable amount of flexibility is attained by such inter-changeability.

It is an even further object of the invention, to provide a display unit, in which various colored plastics may be used, to enhance the general appearance of the unit, and to so form those parts in relatively simple form, so as to permit of the inter-engagement and inter-locking of various of the parts, to thus provide for rigidity of the unit as a whole.

It is a further object of the invention, to provide a vessel, which may be formed of plastic material, and supported upon a base which is similarly formed, the said parts being inter-engaged, and in addition to provide for a further annulus-like vessel member which may be supported on the vessel first mentioned, and inter-engaged in a novel manner therewith, to maintain the rigidity, the use of the second vessel in conjunction with certain stiffening members engaged with both of the same providing for the mounting of a further stiffening and supporting unit above the vessel upon which flowers or the like may be displayed.

Other and further objects of the invention will be understood from a consideration of the appended specification and set forth in the drawings wherein:

Figure 1 is a vertical cross sectional view in elevation showing the general arrangement of the primary parts provided.

Figure 2 is a top plan view showing the outline of the units, and certain of the relationships existing between various of the parts.

Figure 3 is a vertical sectional view, taken about on the line 3—3 of Figure 1 looking in the direction of the arrows.

Figure 4 is a fragmentary view of a detail of construction, taken about on the line 4—4 of Figure 3, looking in the direction of the arrows, certain parts being omitted.

Figure 5 is a vertical sectional view, fragmentary in nature, taken about on the line 5—5 of Figure 4 looking in the direction of the arrows.

Figure 13 is a perspective view of one of the stiffening members.

Figure 14 is a perspective view of one of the wedge members used in conjunction with the stiffening member of Figure 13.

Figure 6:
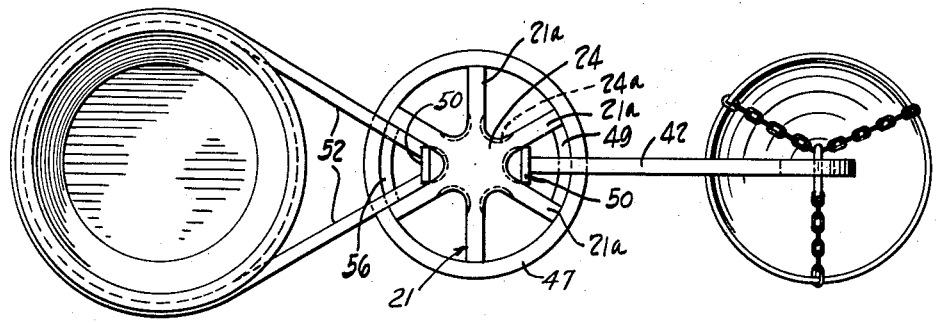
Figure 6 is a top plan view, fragmentary in nature showing the arrangement of certain of the individual supporting devices used, the same being somewhat enlarged in proportion to the other figures in the drawings.
Figure 12:
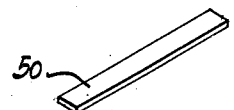
Figure 12 is a perspective view of a wedge member used in the disclosure of Figures 6 and 7.
Figures 10, 11:
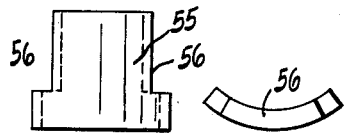
Figure 10 is a view in side elevation showing a different form of lock parts, used in the disclosure of Figure 7.
Figure 11 is a top plan view of the part shown in Figure 10.

Referring now to Fig. 1 primarily, there is shown a main body or vessel generally designated 1, which includes a bottom member 2, and the upstanding, slightly flared side and end members 3 and 4 respectively, the outline of the same, being somewhat more clearly indicated in Figure 2. It should be understood that the side and end members 3 and 4 form a substantially continuous wall, and at the ends the units may be rectangular or somewhat rounded as desired in the formation of the vessel 1.

At the juncture of the side and end walls with the bottom 2, the same is formed with a ridge 5, extending around the periphery of the bottom 2. At the upper edges of the side and end walls, the same are formed with a curved lip, which being continuous is designated 6. The lip as noted curves outwardly and somewhat down below the upper edge of the vessel for purposes which will be hereinafter set forth.

A main support or stand generally designated 7, is formed so as to have at its periphery, the said stand being of substantially similar shape to the vessel 1, a section formed so as to inter-engage with the portion 5 of the vessel 1, and to include the outwardly flared side and end walls designated 8 and 9, the said walls being in the form of a continuous wall actually, and terminating in a lip similar to the lip 6, and designated 10.

In view of the fact that vessel 1 is preferably formed of plastic material, and thus of relatively thin cross section, it is desirable and found important, to provide stiffening members extending between the sides, which stiffening members are designated 11, being those at the ends of the vessel, and an additional stiffening member designated 12, substantially located therebetween.

As seen in Figures 2 and 13, the stiffening members 11 are of generally T-shape outline, including an end section 13, which is formed with a downwardly curved part 14, and a rolled edge or lip 15 at each of the termini of the body or stiffening member 11.

As seen in Figures 1, 2, and 3, the stiffening members 11 are mounted upon the rolled edge or lip 6, so as to extend across and engage with the lip at the side walls 3, and also to engage with the lip at the end walls 4. The rolled edges 15 inter-engage with the lip 6, and will obviously provide rigidity so as to prevent distortion of the ends of the vessel. Similarly the stiffening member 12 is provided, the same being a simple straight portion of the type shown in Figure 13, likewise having parts which inter-engage with the lip 6 to prevent distortion of the side walls 3 as will be apparent.

In order to positively interconnect the stiffening members 11 and 12, suitable wedges 16 are provided, and as shown in Figures 1 and 3, inserted between the underside of the lip 6, and the upper surface of the portion of the rolled edge 15 of the stiffening members. This will clearly prevent undesirable displacement of the said stiffening members and effect substantial rigidity to the units.

Considering again Figures 1 and 3 it will be noted that a second vessel or container generally designated 17 is provided, the same being of generally rectilinear-like shape or configuration, including a downwardly extending section 18, formed so as to be susceptible of being seated in the curved sections 14 of the stiffening members 11, it being remembered that the stiffening member 12 is similarly formed. This second vessel 17 is intended to support earth or the like in which flowers may be grown, and in view of the potential weight which will be involved, the said inter-engagement of the sections 18 and 14 will clearly provide additional rigidity and stiffness to the unit as a whole. Of course the vessel 17 is provided in order to be removable and will, and may be dispensed with if the user of the display so desires, without affecting adversely the rigidity of the units, although under normal conditions of use the said vessel 17 will be in place as disclosed in the drawings.

Extending upwardly above the vessel and supported thereon, are the stiffening and supporting units generally designated 19 and 20, to be more particularly described hereinafter. In order to maintain the said units in their upright position the botom of the unit 2, is equipped with transversely extending plate like units, generally substantially rectangular in outline, which are suitably fastened to the side walls 3 and form sockets for columns designated 21. The cross plates are denoted 22, there being three of the same provided in this instance.

As seen in the Figures 4 and 6, the columns 21, are fluted so to speak, including a main central section 24 and the outwardly diverging arms 21a integral therewith. At the juncture of the arms 21a, with the central section 24, in each case the said central section is formed with tooth-like sections, for purposes which will be hereinafter more fully explained.

The columns 21, as shown in Figure 1 extend upwardly from the sockets including the plate members 22, through the stiffening members 11 and 12 and are thus maintained in their normal vertical positions thereby. Above the vessel, the columns 21 support brace members generally designated 25, the same being of substantially similar cross section and dimension, and more clearly shown in cross section in Figure 3. The said brace members 25 are in reality channels including a main member 26 and the side members 27 integrally formed therewith, and extending in somewhat diverging manner therefrom. At the free edges of the side members 27, suitable flanges 28 are provided.

In order to maintain the brace members 25 in their positions, and it should be noted that the same are intended to be adjustable, suitable adjusting devices are furnished, the same being shown in Figures 4 and 5 in somewhat enlarged condition. These adjusting members include a generally T-shaped lock member 29, having tooth-like members at one edge adapted to interengage with and be maintained in connection with the tooth-like sections designated 24a of the columns 21, the tooth-like edges of the members 29 being designated 29a. The lock members 29 are intended to be maintained in the positions described, by means of lock rings 30, the said lock rings 30 having an upper edge 31, angularly formed with respect to the axis of each ring. The ring 30 is intended in each case to have some frictional engagement with the edges of the radially extending arms 21a. Thus when the supporting and stiffening unit 19 is being assembled, the lock member 29 will be positioned where it is desired to maintain the lower of the two braces 25 shown, and thereafter the lock ring 30 is slipped downwardly over the end of the column to which it is to be associated, and into engagement with the lock member 29, thus maintaining the same in position. Thereafter the brace member 25, being provided with a suitable opening therein to receive the column will be mounted in its position, as shown in Figure 3 for example and supported therein by the adjustable locking devices hereinabove described.

It will be apparent that the other of the brace members will be similarly positioned and maintained in its adjusted location as desired, the provision of the two braces 25, in a manner to engage all of the columns, clearly adding stiffness and rigidity to the unit as a whole by reason of their extent and manner of connection with the columns and their support upon the vessel 1 of the invention.

Figure 15:
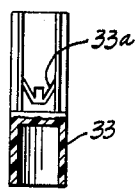
Figure 15 is an enlarged partially sectional view showing a positioning member and the form thereof used in the disclosure of Figure 1.
Figure 18:
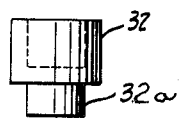
Figure 18 is an enlarged view of a socket used in conjunction with one of the brace members.

One of the brace members 25 may be equipped with suitable socket-like parts, indicated at 32, and shown in enlarged form in Figure 18, the said sockets 32 including portions 32a thereon adapted to be entered in suitable holes formed in the lower side members 27 of the brace members 25, and as seen in Figure 1 said sockets 32 are positioned so as to receive and support in a manner extending upwardly therefrom additional columns 21, said columns 21 being similar to and in fact may be identical with the columns 21 previously referred to. The columns 21 extend upwardly through co-mating openings in the upper brace member 25 as shown in the drawing, to positions of substantially greater height than the initially described columns 21. The unit 20, being a supporting and stiffening unit similar to the unit 19, is equipped with an arch member 35, which arch member is supported at the upper ends of the columns 21 by means of the socket-like elements 33, shown in enlarged detail in Figure 15. These socketlike elements 33 are tubular in general configuration, at least at the lower portion thereof, the upper section of the tube being cut away as shown at 34.

Figure 16:
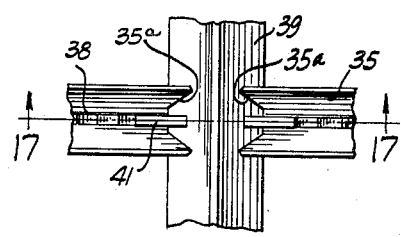
Figure 16 is a top plan, partially fragmentary view, showing the manner of inter-engagement of certain of the parts used in Figure 1.

It is pointed out that the arch includes a main arch member 35, somewhat more clearly shown in Figures 2 and 3, the same being of V-shape in cross section and arcuate in general elevation as seen in Figure 1. The details of the arch member 35 are shown somewhat enlarged in Figures 17 and 16, the same including at the inner apex of the arch member 35 the tooth-like section 38 which extends along the entire member.

Figure 17:
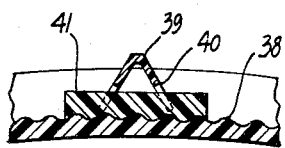
Figure 17 is a vertical sectional view taken about on the line 17—17 of Figure 16.

The arch member 35, is adapted to inter-engage with and be maintained in position on the socket-like elements 33 by suitable provision in the socket elements 33 of V-shaped openings 33a therein, so as to receive the angle member 35 therein, as will be understood. The arch member is adapted to receive thereon, the transverse inverted V-shaped members 39 which may be positioned as desired having suitable V-shaped openings 35a to receive the arch member. Intermediate the ends of the members 39, the same are provided with slots 40, the said slots being cut out of the oppositely extending portions of the members 39, and when the said members 39 are positioned with respect to the member 35, the same may be maintained in their positions by means of the keys such as shown in Figure 17 and designated 41. The keys 41 are provided with a tooth-like edge, to inter-engage with the tooth-like section 38 of the member 35 and thus prevents endwise displacement of the members 39 as will be apparent. These members 39 are provided for the purpose of entraining vines or hanging flowers therefrom as will be understood. The arch 35 thus stiffens the unit further, by reason of the fact that it is inter-engaged with the upper ends of the columns 21 of the supporting and stiffening unit 20, and maintained in its position thereon by means of the inter-connecting parts previously described.

Referring now to Figures 3 and 6 to 12 primarily, novel supporting instrumentalities for flower pots or the like are provided, so as to be inter-engaged with and supported on the columns 21 of the unit 20 for example, and adapted to be positioned in a plurality of positions thereon as will be understood from the description hereinafter set forth.

Figure 7:
Figure 7 is a fragmentary view in side elevation, certain of the parts being shown in section, of the disclosure of Figure 6.
Figure 8:
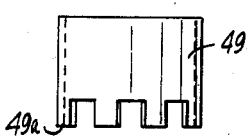
Figure 8 is a view in elevation of one of the locking parts used in conjunction with the arrangement shown in Figure 7.
Figure 9:
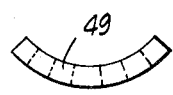
Figure 9 is a top plan view of the part shown in Figure 8.

Considering Figures 6 and 7 primarily, it will be seen that the columns 21 have been shown on a greatly enlarged scale, and initially the supporting device at the right hand portion of Figure 7 will be described. This device includes an outwardly extending main arm 42, and a downwardly extending inter-engaging arm portion 43, formed integrally therewith. The arm portion 43 is cut away as at 44, and below the cut away portion 44 is an inter-engaging section 45, formed with a tooth-like edge 46 thereon. The tooth-like edge 46 is of course intended to engage in the tooth-like members 24a previously referred to, and in order to maintain the supporting member 42 in the position shown, a suitable lock ring 47 is furnished. The lock ring 47 is of substantially the same diameter as the column 21, and there is adapted to be mounted between the lock ring 47 and the reduced section 43 of the member 42, in a suitable recess provided therefor and designated 48, a lock member 49, shown in Figure 8 in large detail. The lock member 49 is intended to be positioned as shown in Figure 6, and includes the downwardly extending tooth-like section 49a thereon. The lock member 49 as shown in Figure 7, is initially positioned in the recess 48, the teeth 49a thereon engaging at opposite sides with the body 42 at the reduced section 43 thereof, the member 42 having been previously positioned where the same is desired to be located, and thereafter the lock ring 47 is slipped upwardly into the position shown in Figure 7. Subsequently a wedge 50, is inserted between the diverging or radial arms 21a, as seen in Figure 6, so as to engage with the adjacent shoulder 44a of the member 42. Thus the wedge prevents unwanted movement of the member 42, and the lock ring and lock member 49 maintain the said member in proper position, in conjunction with the inter-engagement of the teeth 46 and 24a as will be understood. It should be noted that the member 42 is of relatively thin nature, and thus the lock 49 will prevent lateral movement of the same, by reason of the inter-engagement of the teeth 49a with the reduced portion 43 as will be clear from a consideration of Figures 7 and 6.

A somewhat different form of supporting unit is shown at the left hand portion of Figures 6 and 7, and includes a pot engaging section formed of flat material and including the coverging arms 52, which arms 52 meet at the inner ends thereof, said inner ends being formed in a substantially identical manner to the inner portion of the member 42 previously referred to, and shown in dotted lines in Figure 7, including a downwardly extending section of reduced proportions designated 53, and the parts thereof extending below the same which includes the toothed section 54 formed therewith. A lock member designated 55 is provided, the same having the notches 56 at opposite edges thereof, which notches 56 are intended to engage at their edges which will be apparent, with the diverging arms 52. The said lock member 55 is intended to be supported in position as shown in Figure 6, so as to engage at its outer face with the inner face of the lock ring 47, and thus be prevented from being displaced therefrom. Also a wedge 50 is provided, so as to be inserted when the pot supporting member is in place, and prevent vertical movement of the same which would cause disengagement of the toothed section 54 from the corresponding toothed section 24a of the column 21.

Reverting now to a description of Figure 1, it will be noted that the brace members 25 may be equipped so as to support additional rod-like members 53, extending upwardly from the said brace members 25, and inter-engaged in suitable openings formed therein. These rod-like members 53, are adapted to be equipped with further supporting arms designated 54 and 55, which arms may be formed of plastic or other similar spring-like material having the frictional locking sections 54a and 55a respectively. It will be understood that by suitable manipulation of the locking portions 55a and 54a the members 54 and 55 may be adjusted upwardly and downwardly on the rod-like members 53, and said members 54 and 55 are adapted to support flower pots or the like, similar to that shown in the right hand portion of Figure 7.

A suitable drain opening in the vessel 17 may be provided as shown at 57, which will direct liquid to the lower vessel 1, that vessel likewise having a drain opening at 58. Each of these drain openings are preferably equipped with removable plugs.

In order to provide for different locations of the columns 21 and the parts supported thereby suitable additional openings 59 and 60 are provided in the stiffening members 11 and 12. Alined openings 61 and 62 are formed in the plates 22 as will be seen in Figure 3.

Figure 19:
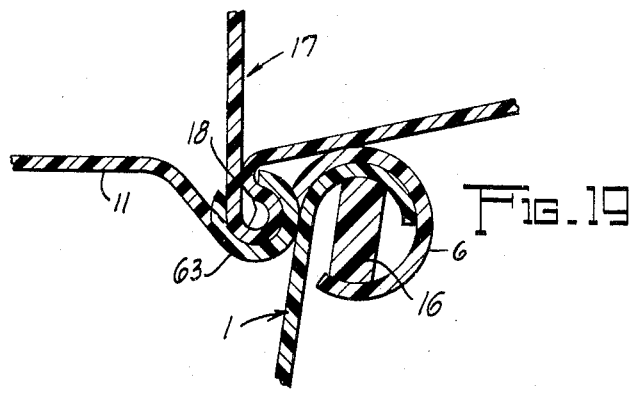
Figure 19 is an enlarged fragmentary view in section illustrating means for fastening certain of the parts.
Figure 21:
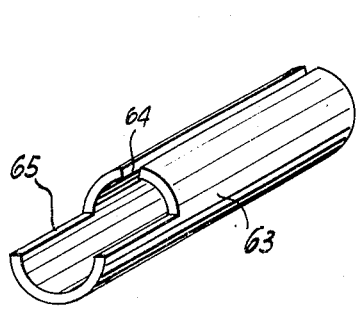
Figure 21 is a perspective view of a part of the lock means for maintaining one of the vessels in position.
Figure 20:
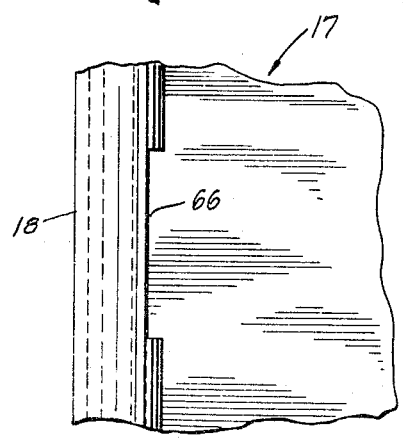
Figure 20 is a fragmentary view in bottom elevation of a portion of one of the vessels.

In Figures 19, 20 and 21 a means for fastening the rectilinear-like vessel 17 to the stiffening members 11 and 12 is shown. This is also illustrated generally in Figure 1 and includes a tubular member 63 (shown in perspective in Figure 21) which is slotted at 64. At one end the member 63 is cut away as at 65.

The lower edge 18 of the vessel 17 is provided with a notch 66 as seen in Figure 20, whereby the tubular member may be positioned so as to substantially surround the portion 18. Thereafter when the vessel 17 is in place as shown in Figure 1, the member 63 may be moved into the position as shown in that figure with the end at the cut away portion 65 thus lying beneath the portion 14 of the member 12 for example, which will effectively prevent displacement of the vessel 17. It is noted that several tubular members 63 are intended to be used and thus additional rigidity and strength of the unit results.

I claim:

1. In a display unit of the class described in combination, a main upwardly open vessel of generally rectilinear configuration having a bottom and side and end walls extending upwardly at the periphery thereof, said vessel being formed of relatively thin flexible material, transverse stiffening members extending across the opening and engaged with certain of said walls, a stiffening and supporting unit mounted on said vessel including spaced columns inter-engaged with said vessel and stiffening members, said columns extending above said vessel and brace means mounted on said columns and extending therebetween.

2. The combination as claimed in claim 1, wherein certain of the said stiffening members engage side and end walls of the vessel, a column extends upwardly through an opening in each member, and the brace means are vertically adjustable on said columns.

3. The combination as claimed in claim 1, wherein, a second vessel of generally rectilinear configuration is seated at the upper edges of said side and end walls and includes elements inter-engaged with the said stiffening members, to maintain said walls in normal relation.

4. The combination as claimed in claim 1, wherein, the upper edges of the side and end walls form a continuous lip, the stiffening members are formed with elements engaging said lip, and locking devices are mounted between said lip and the elements to prevent displacement of said members.

5. In a display unit of the class described, in combination, an upwardly open vessel having a continuous side wall and a bottom integral therewith, said vessel being formed of relatively thin flexible material, transverse stiffening members seated at the opening in said vessel and interengaged with the walls at said opening, a supporting and stiffening unit extending from within the vessel, said unit including spaced columns seated on the bottom of the vessel, extending through said stiffening members to points above the same, and brace means connecting said columns at the upper ends thereof and having provisions for mounting display devices thereon, said stiffening members, columns, and brace means affording rigidity and stiffness for said vessel.

6. The combination as claimed in claim 5, wherein a second set of columns is mounted on the brace means and an arch member extends between and is interconnected therewith, all of the columns are provided with means for adjustably mounting display members thereon, said columns are interchangeable and the said means are adapted to provide adjustable positioning of the brace means mentioned.

7. The combination as claimed in claim 6, wherein the brace means comprise a pair of parallel channel members, having openings for receiving the columns first mentioned, the other columns are seated in sockets in one of said channel members and extending upwardly through openings in the parallel brace means, and locking devices are provided at the upper ends of said other columns, the arch member mentioned having lock portions, and locking instrumentalities are provided to engage said locking devices and lock portions.

8. The combination as claimed in claim 5, wherein, the upper edge of the wall is formed with an outwardly extending lip, the stiffening members include portions engaging said lip and extending therebeneath, and locking devices are mounted between said lip and said portions to maintain said members in position at the opening of the vessel.

9. The combination as claimed in claim 5, wherein, the stiffening members are formed with seats positioned below the opening in the vessel, and a second vessel of rectilinear-like form is mounted at said opening, said second vessel having a portion formed so as to be received in said seats, the interengagement effected thereby affording rigidity and stiffness to said first described vessel.

References Cited in the file of this patent

UNITED STATES PATENTS

| | | |
|---|---|---|
| 255,314 | McCallum | Mar. 21, 1882 |
| 877,791 | Moulie | Jan. 28, 1908 |
| 1,423,906 | Brettschneider | July 25, 1922 |
| 2,083,678 | Wilson | June 15, 1937 |
| 2,246,441 | Hurlbut | June 17, 1941 |